United States Patent [19]

Takeuchi

[11] 4,005,638
[45] Feb. 1, 1977

[54] VACUUM-SUSPENDED TIRE SERVO-MOTOR

[75] Inventor: Hiroo Takeuchi, Ueda, Japan

[73] Assignee: Nisshin Kogyo Kabushiki Kaisha, Ueda, Japan

[22] Filed: Dec. 8, 1975

[21] Appl. No.: 638,689

[30] Foreign Application Priority Data

Feb. 18, 1975 Japan .............................. 50-19473

[52] U.S. Cl. .............................. 91/369 B; 91/376 R
[51] Int. Cl.² .......................................... F15B 9/10
[58] Field of Search ...................... 91/369 B, 376 R

[56] References Cited

UNITED STATES PATENTS

| | | | |
|---|---|---|---|
| 3,150,493 | 9/1964 | Rike | 91/369 B |
| 3,183,789 | 5/1965 | Stelzer | 91/369 B |
| 3,661,054 | 5/1972 | Brown | 91/369 B |

Primary Examiner—Paul E. Maslousky

[57] ABSTRACT

A servo-motor including control valve and reaction means of novel design is provided which has improved operation characteristics with a minimum of hysteresis, enabling the driver to lightly operate a brake or other associated system while accurately feeling the reaction therefrom. The control valve means precludes any loss of vacuum from a first power chamber as may otherwise occur when a second power chamber is placed into communication with the atmosphere and, eliminating the need for sealing means as arranged around an input member extending through a movable wall of the servo-motor, minimizes the resistance to axial sliding movement of the input member. The motor structure is simplified and includes a minimum number of component parts.

3 Claims, 2 Drawing Figures

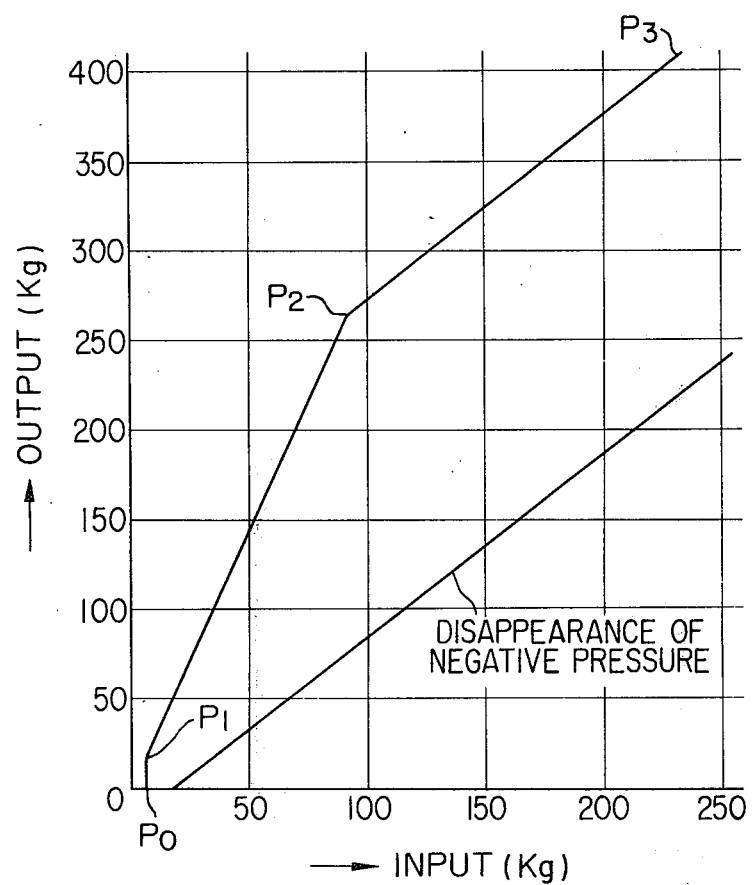

VACUUM-SUSPENDED TIRE SERVO-MOTOR

BACKGROUND OF THE INVENTION

This invention relates to servo-motors of the vacuum-suspended type principally intended for use in the braking system of road vehicles and the like.

Previously known forms of servo-motor of the type concerned typically include a casing divided by a movable wall member into two power chambers, that is, into a first chamber to which vacuum is always communicated and a second chamber which is selectively placed into communication with the first chamber and the external atmosphere by control valve means, which is operable by an input member slidably fitted in the movable wall member. An output member is operatively connected with the movable wall member on the front side thereof and movable under the effect of the pressure difference occurring between the first and second power chambers when the second power chamber is placed in communication with the external atmosphere.

In such forms of servo-motor, in order to improve the responsivity to the input and obtain an input-output characteristic free from any substantial hysteresis, it is required, among other things, that any loss of vacuum in the first power chamber, when the second power chamber is changed in state of pressure from vacuum to atmospheric under the action of the control valve, is effectively prevented, that the change in state of the second power chamber is effected rapidly and that the resistance to the axial sliding movement of the input member is held to a minimum.

SUMMARY OF THE INVENTION

Accordingly, the present invention has as an object the provision of an improved vacuum-suspended type servo-motor which is adapted to meet the requirements described above.

Another object of the present invention is to provide a vacuum-suspended type servo-motor of the character described which is of simplified structure and, includes a minimized number of component parts.

A further object of the invention is to provide a vacuum-suspended type servo-motor of the character described which is so designed that the braking or other operating system associated therewith can be started to operate without any delay in time and that, once the system has been effectively started, the driver can operate the input member in a efficient manner accurately feeling the reaction from the operating system.

These and other objects, features and advantages of the present invention will become apparent from the following description when taken in conjunction with the accompanying drawings.

BRIEF DESCRIPTION OF THE DRAWINGS

In the drawings:

FIG. 2 is a diagram illustrating input-output characteristics obtained with the embodiment.

DESCRIPTION OF THE PREFERRED EMBODIMENT

Figure 1:
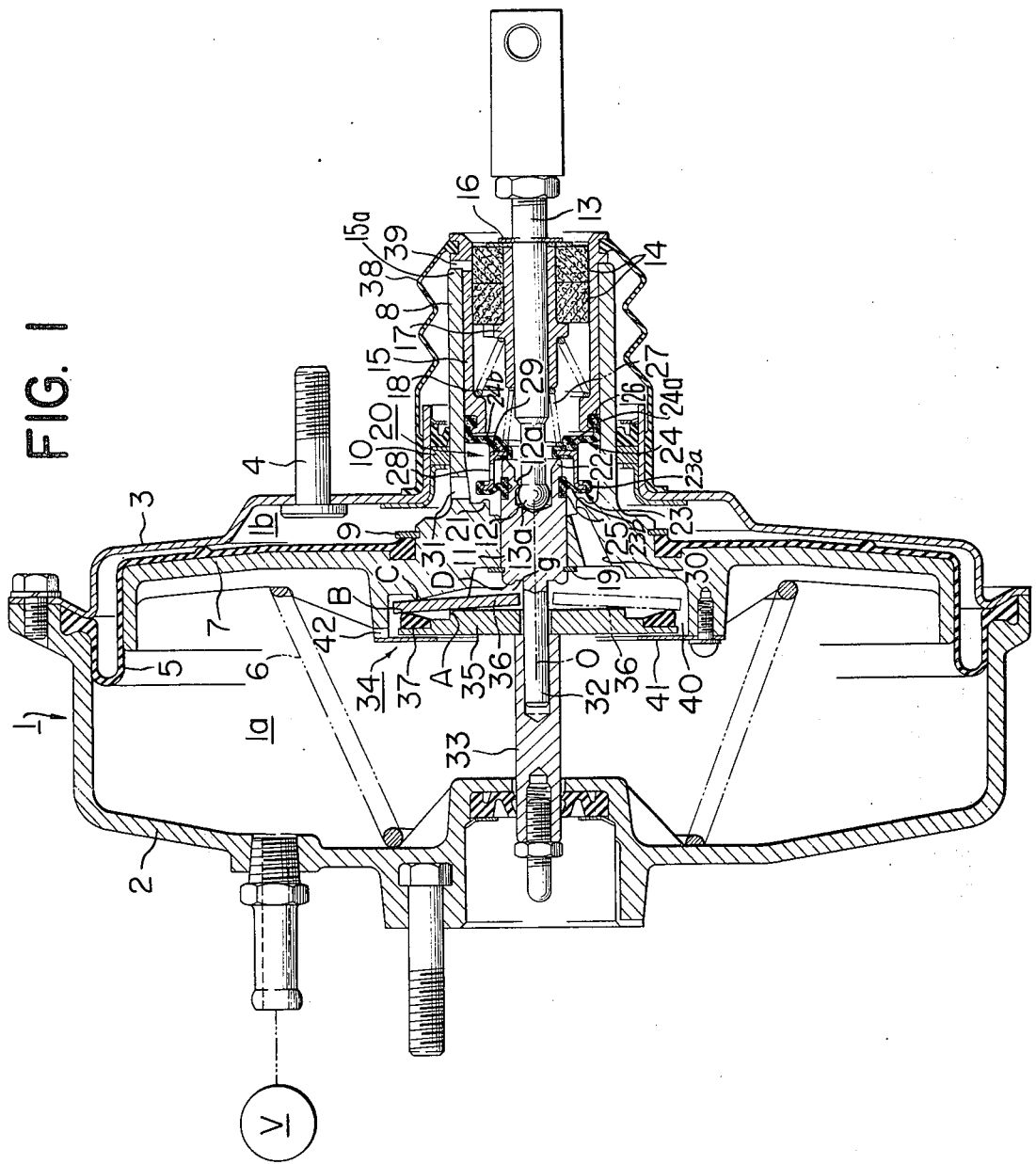
FIG. 1 is an axial cross-sectional side elevation of a preferred embodiment of the invention.

Referring to the drawings, which illustrate a vacuum-suspended type servo-motor embodying the present invention and usable in an automotive braking system, reference numeral 1 indicates a casing structure comprised of a pair of front and rear cup-shaped casing sections 2 and 3 secured to each other around the periphery thereof. The structure 1 is firmly secured to the vehicle body (not shown) by bolt means 4 and has the interior space divided by a movable wall or diaphragm 5 into a first and a second power chamber 1a and 1b. The first power chamber 1a is held at all times in communication with a vacuum source V, for example, the intake manifold of the engine, while the second power chamber 1b is arranged so as to be selectively placed into communication with the first power chamber 1a and the external atmosphere under the action of a control valve 20, which will be described hereinafter in detail.

Held in close contact with the front surface of the disphragm 5 is a rigid diaphragm-supporting plate 7 which is normally biased rearwardly by a restoring spring 6. A tubular valve casing 8 is formed integral with the central portion of the diaphragm-supporting plate 7 to extend rearwardly therefrom with the inner peripheral edge portion of the diaphragm 5 secured to the base portion of tubular valve casing 8 by means of a retainer ring 9. As shown, the tubular valve casing 8 is slidably supported by the rear wall or cup-shaped casing section 3 through the medium of a plain bearing 10 and is open at the rear end to the atmosphere.

The servo-motor includes an input member 11 slidably supported by the diaphragm-supporting plate 7 and extending through the central portion thereof rearwardly into the tubular valve casing 8. Formed in the rear end of the input member 11 is an axial engaging recess or bore 12 which receives the global front end portion 13a of a thrust rod 13, which is connected at the rear end with a brake pedal (not shown). A portion of the side wall of the engaging bore 12 is swaged as indicated at 12a to join the input member 11 and thrust rod 13 with each other. It is to be observed that in the sliding region between the diaphragm-supporting plate 7 and the input member 11 slidably extending therethrough there is provided no sealing means as intended to prevent fluid communication between the first and second power chambers 1a and 1b.

Fitted in the rear portion of the valve casing 8 is a tubular member 15 in which a mass of air filter material is slidably fitted and wich member 15 is formed at the rear end with an annular shoulder 15a for abutting engagement with the annular rear end face of the valve casing 8. As shown, the filter material 14 is held clamped between a retainer ring 16 secured to the thrust rod 13 and a flanged sleeve 17 fixedly fitted thereover with a restoring spring 18 arranged under compression between the flange portion of sleeve 17 and an annular shoulder formed on the inner periphery of the tubular member 15. It is to be understood that the restoring spring 18 serves the dual function of normally biasing the thrust rod 13 and input member 11 rearwardly to their normal retracted position by way of the flanged sleeve 17 while at the same time holding the tubular member 15 in an axial position shown with its annular shoulder 15a held in abutting engagement with the adjacent end face of the valve casing 8. The retracting movement of input member 11 is limited by a retainer ring 19 secured to the front end thereof for abutting engagement with the front side of diaphragm-supporting plate 7.

The control valve 20 referred to hereinbefore is constructed and arranged within the tubular valve casing 8 as follows:

The valve casing 8 has a front end wall formed as an integral part of the diaphragm-supporting plate 7 and a first annular valve seat 21 is formed inside the valve casing 8 on the front end wall thereof in encircling relation to the input member 11. Reference numeral 22 indicates a second annular valve seat formed on the rear end face of the input member 11; and 23 indicates a first annular valve member including an outer peripheral portion 23a formed to serve as a first valve closure element cooperable with the first valve seat 21, an inner peripheral portion sealingly fitted in an annular groove 25 formed about the rear porton of input member 11 and a intermediate flexible web portion 23b. Reference numeral 24 indicates a second annular valve member comprised of an inner peripheral portion 24a formed to serve as a second valve closure element cooperable with the second valve seat 22 formed on the input member 11, an intermediate flexible web portion 24b and an outer peripheral portion sealingly fitted between the inner wall surface of the tubular valve casing 8 and the front end portion of tubular member 15, which is circumferentially grooved as at 26 to receive the adjacent edge of the second valve member 24. It is to be understood that the annular valve members 23 and 24 are both formed of rubber or like elastic material and are joined with each other by means of an annular reinforcement member 29 having its opposite end portions embedded in the respective valve closure element portions 23a and 24a of the valve members. A through hole 28 is formed in the cylindrical web portion of the reinforcement member 29. The reinforcement member 29 is of such a size that the valve closure elements 23a and 24a are held axially spaced from each other by a distance smaller than that between the first and second valve seats 21 and 22 when the input member 11 is in its restored or rearmost position. A valve spring 27 is arranged between the second valve closure element 24a and the front end face of flanged sleeve 17 to bias the second valve closure element 24a and hence the first valve closure element 23a axially forwardly of the servomotor.

As will be observed, the space radially inside of the first valve seat 21 is in communication with the first power chamber 1a through a hole 30 formed in the diaphragm-supporting plate 7 and the space outside the first and second valve seats 21 and 22 are in communication with the second power chamber 1b through a radial hole 31 formed in the side wall of tubular valve casing 8. The inside of the second valve seat 22 is in communication with the interior space of the tubular member 15 and, through the filter material 14, with the external atmosphere.

The input member 11 has an integral reduced-diameter stem portion 32 extending axially forwardly from the front end thereof and slidably fitted into an output member 33 to support the latter in axially aligned relation with the input member 11. The output member 33 extends forwardly through the front cup-shaped casing section 2 and is operatively connected at the rear end with the diaphragm-supporting plate 7 by means of a reaction device 34, as will be described below in detail. It will be understood that the output member 33 is operatively connected at the front end to an appropriate brake master cylinder not shown.

The reaction device 34 includes a reaction disk 35 slidably mounted on the reduced-diameter stem portion 32 of input member 11 in abutting engagement with the rear end face of output member 33 and a plurality of reaction levers 36 radially arranged between the reaction disk 35 and the diaphragm-supporting plate 7 around the reduced-diameter stem portion 32 of the input member 11. The reaction disk 35, diaphragm-supporting plate 7 and input member 11 are formed on the respective faces opposite to the reaction levers 36 with a first and a second annular fulcrum A and B, a third annular fulcrum C, and a fourth annular fulcrum D, respectively, each extending circumferentially about the axis O of the input member 11. Among others, the second annular fulcrum B is formed on an annular ring of elastic material, 37, thermally bonded to the reaction disc 35 as an integral part thereof. As illustrated, the radii of the annular fulcrums A, B, C and D, i.e., the distances thereof from the axis O of input member 11 are determined to meet the following condition:

$$\overline{OD} < \overline{OA} < \overline{OC} < \overline{OB}$$

A dust-sealing collapsible boot 38 is arranged between the rear wall or section 3 of the casing structure 1 and the shoulder portion 15a of tubular member 15 to preclude ingress of dust into the sliding regions between the valve casing 8 and the associated parts 3 and 15 and particularly into the plain bearing 10. The tubular member 15 is formed with a vent hole 39 through which atmospheric air is breathed into and out of the annular space betwen the collapsible boot 38 and tubular valve casing 8 in a state filtered clean by the air filter material 14 as the boot 38 is axially expanded and contracted in operation.

Reference numeral 40 indicates a reaction chamber defined on the front side of the diaphragm-supporting plate 7 by a forwardly extending annular projection formed thereon and in which chamber the reaction device 34 is accommodated. Reference numeral 41 indicates an annular cover plate secured to the front end face of the annular wall of chamber 40; which is held at all times in communication with the first power chamber 1a through a radial aperture 42 formed in the annular wall of chamber 40.

Description will next be made of the operation of the above-described servo-motor, which is illustrated in the drawing in the normal, unoperated state. In the state illustrated, the input member 11 is held in its retracted position under the bis of restoring spring 18 and, since the axial distance between the first and second valve seats 21 and 22 is larger than that defined by the annular reinforcement member 29 between the valve closure elements 23a and 24a of the first and second valve members 23 and 24, respectively, the second valve closure element 24a is held in abutting engagement with the second valve seat 22 under the bias of valve closure element 23a is held spaced rearwardly from the first valve seat 21. Accordingly, the first and second power chamber 1a and 1b in the casing structure 1 are in communication with each other through the holes 30 and 31 respectively formed in the diaphragm-supporting plate 7 and in the valve casing 8 formed integral therewith but are closed to the interior space of the tubular member 15 which is in communication with the external atmosphere. In this connection, the outer peripheral portion of the second valve member 24 serves effectively to prevent any atmospheric air from entering the space radially outside of the second valve seat 22 through between the interfitting valve casing 8 and tubular member 15.

Under this condition, the subatmospheric pressure or vacuum introduced from the vacuum source V into the first power chamber 1a is further led into the second power chamber 1b to maintain the two power chambers in a state balanced in pressure with each other, allowing the diaphragm 5 and supporting plate 7 to be held in a position retracted into pressure contact with the rear cup-shaped casing section 3 under the bias of restoring spring 6. In accordance with this, the output member 33 is held in its retracted position, and the reaction levers 36 are each held in a position supported on one side by the first and second fulcrums A and B and on the other side by the third fulcrum C and spaced a definite axial distance $g$ from the fourth fulcrum D, as illustrated.

Now, in braking the vehicle, when the brake pedal is stepped on to drive the thrust rod 13 forwardly against the bias of spring 18 thereby to push forward the input member 11, initially the valve closure element portion 24a of the second valve member 24 is moved forward with the advancing inlet member 11 under the bias of valve spring 27, closely following the second valve seat 22 formed on the input member 11 while deflecting the flexible web portions 23b and 24b of the first and second valve members 23 and 24, until the valve closure element portion 23a of the first valve member 23 is brought into engagement with the first valve seat 21, and subsequently the second valve seat 22 is separated from the valve closure element portion 24a of the second valve member 24, now held stationary. In this manner, as soon as communication between the first and second power chambers 1a and 1b is closed off, the seond power chamber 1b is placed in communication with the interior of the tubular means 15 by way of through holes 31 nd 28 and fed with atmospheric air cleaned by the air filter material 14. On this occasion, it is to e noted that the inner peripheral portion 23a of the first valve member 23, which is in sealing engagement with the peripheral groove 25 of the input member 11, serves effectively to preclude any leakage of vacuum from the first power chamber 1a into the second power chamber $b$ along the outer periphery of input member 11 with the valve closure element portion 23a seated against the first valve seat 21. The pressure difference occurring between the first and second power chambers 1a and 1b causes the diaphragm 5 to move forwardly together with the supporting plate 7 against the bias of restoring spring 6; and the forward movement of the supporting plate 7 is transmitted at the third fulcrum C to the reaction levers 36 and thence to the reaction disk 35 through the first and second fulcrums A and B so that the output member 33 is actuated forwardly.

Initially in the diaphragm operation, however, any reaction force from the output member 33 is not transmitted to the input member 11 as the fourth fulcrum D formed thereon is out of contact with reaction levers 36, allowing the output of the output member 33 to rise rapidly irrespective of the magnitude of the pedal input, as represented in the diagram of FIG. 2 by the starting region $P_0 - P_1$ of the flexed one of the characteristic curves illustrated therein. This means that, when the input member 11 is started to advance, the brake master cylinder is actuated instantaneously to eliminate any plays normally existing in the brake system, including the terminal brake units.

On the other hand, the annular ring of elastic material, 37, is compressed under the force acting through the second fulcrum B, allowing the reaction levers 36 to rock about the first fulcrum A until the levers are placed at the inner ends thereof in contact with the fourth fulcrum D when the output of output member 33 reaches point $P_1$ in FIG. 2.

Thereafter, a proportion of the reaction force of output member 33 acting upon the reaction disk 35 is transmitted to the input member 11 through the fourth fulcrum D to counterbalance the force of input to the input member 11. Accordingly, the output from the output member 33 is increased now in proportion to the input to the input member 11, as illustrated in FIG. 2 by the intermediate region $P_1 - P_2$ of the same characteristic curve. This enables the driver to operate the brake master cylinder with an appropriate power amplification to obtain the braking effect desired by properly controlling the brake pedal.

It is to be noted that the point $P_2$ represents a maximum level of power amplification corresponding to the maximum pressure difference obtainable between the two power chambers 1a and 1b and increase to output beyond the point $P_2$ depends solely upon the input as illustrated in FIG. 2 by the region $P_2 - P_3$ of the same characteristic curve.

With the servo-motor described, it will be noted that, if the vacuum in the first power chamber 1a be exhausted, for example, on account of a failure in the system of vacuum source, the input to the input member 11 is directly transmitted to the output member 33 through the medium of the reaction unit including reaction levers 36 and reaction disk 35 and accordingly the brake master cylinder can be operated solely under control of the input.

As will be apparent from the foregoing description, the servo-motor of the present invention has various advantages over any conventional forms of servo-motor. First, because of the arrangement of two separate valve members 23 and 24 cooperating with respective valve seats 21 and 22, any leakage of vacuum from the power chambers 1a and 1b can be prevented much more effectively than with the case of previous forms of servo-motor including only a single valve member, owing to the tight sealing engagement obtainable between the valve closure elements 23a and 24a and the respective valve seats 21 and 22. Further, since the two valve members 23 and 24 are interconnected by means of apertured annular reinforcement member 29 so as to be alternately seated against the respective valve seats 21 and 22 and separated therefrom with advancing and retracting movements of the input member 11 and such valve switching operation is effected instantaneously, the servo-motor exhibits a much improved responsivity to the input. In addition, since the two valve members 23 and 24 respectively include intermediate flexible web portions 23b and 24b and there is no sealing means interposed between the input member 11 and the movable wall including diaphragm-supporting plate 7, the input member 11 is movable free from any substantial resistance of the valve members or other sealing means. This not only gives an input-output characteristic with a minimum of hysteresis but also enables the driver to operate the system efficiently with an improved feeling.

In further accordance with the present invention, atmospheric air which enters the second power chamber 1b in the casing structure 1 and that which is drawn into the annular space inside the dust-sealing boot 38, which surrounds the rearwardly projecting portion of tubular valve casing 8, are both cleaned in advance by the same mass of filter material 14, and the restoring spring 13 acting upon the thrust rod 13, connected with the input member 11, is arranged to serve the additional function of holding the tubular member 15, which supports the second valve member 24, in place relative to the tubular valve casing 8. In this manner, the servo-motor of the present invention is much simplified in structure, including a minimum number of component parts.

Further, the servo-motor according to the present invention can exhibit a desired power amplification characteristic with an extraordinarily simple structure including reaction device 34, which comprises, as described hereinbefore, reaction levers 36 supported on one side by the first fulcrum A formed on the rear face of the reaction disk 35 and the second fulcrum B formed on the annular elastic member 37 bonded to the reaction disk 35 and at a greater distance from the axis O of input member 11 than the first fulcrum A and, on the other side, by the third fulcrum C formed on the front side of the movable wall member at location radially intermediate the first and second fulcrums A and B, the radially inner ends of reaction levers 36 thus supported lying opposite to the fourth fulcrum D formed on the front end face of input member 11. With this arrangement, the initial rise of the servo-motor output is so steep that any plays in the brake system or other equipment associated with the servo-motor are immediately eliminated, thus enabling the system to start operation without any delay in time. Once the system has effectively been started, the reaction force therefrom is directly transmitted to the input member 11 so that the driver can operate the brake pedal efficiently while accurately feeling the reaction through the input member.

Although one preferred embodiment of the invention has been shown and described, it will be apparent to those skilled in the art that many changes and modifications may be made therein without departing from the spirit of the invention or the scope of the appended claims.

What is claimed is:

1. A servo-motor of the vacuum-suspended type including:
   a casing structure and a movable wall member dividing the casing structure into a front, first power chamber to which vacuum is always communicated and a rear, second power chamber;
   an input member slidably fitted in said movable wall member;
   an output member operatively connected with said movable wall member on the front side thereof; and
   control valve means operatively connected with said input member and adapted to selectively place said second power chamber into communication with said first power chamber and the external atmosphere;
   said control valve means comprising:
   a tubular valve casing integral with said movable wall member on the rear side thereof and slidably supported by the rear wall of said casing structure, said valve casing having a front end wall constituting part of said movable wall member and opening at the rear end to the external atmosphere;
   a first valve seat on said front end wall of said valve casing inside thereof in encircling relation to said input member;
   a first annular valve member including an inner peripheral portion sealingly secured to said input member around the outer periphery thereof, an outer peripheral portion formed to serve as a valve closure element engageable with said first valve seat and an intermediate flexible web portion, said first valve seat and said first valve member cooperating with each other to define in said valve casing radially inner and outer spaces respectively communicating with said first and second power chambers;
   a second valve seat on the rear end face of said input member;
   a second valve member having an outer peripheral porting sealingly secured to said valve casing around the inner peripheral wall thereof, an inner peripheral portion adapted to serve as a valve closure element engageable with said second valve seat and an intermediate flexible web portion;
   an annular reinforcement member provided with a radial through hole therein and interconnecting said valve closure elements of said first and second valve members integrally with each other to define therebetween an axial distance smaller than that between said first and second valve seats when said input member is in its rearmost position; and
   spring means associated with said first and second valve closure elements to bias the two elements toward said respective valve seats.

2. A vacuum-suspended servo-motor as claimed in claim 1, in which said control valve means further comprises:
   a tubular member fitted in said tubular valve casing and adapted at the front end to support said second valve member in cooperation with said tubular valve casing, said tubular member having a radially outwardly extending annular shoulder at the rear end thereof;
   a mass of air filter material loaded in the rear end portion of said tubular member opening to the external atmosphere;
   a thurst rod extending through said mass of air filter material and connected at the front end with said input member;
   a restoring spring arranged under compression between said tubular member and said thrust rod to rearwardly bias the latter, said spring acting to resiliently hold said annular shoulder of said tubular member in abutting engagement with the rear end face of said tubular valve casing;
   a dust-sealing collapsible boot arranged under tension between said annular shoulder of said tubular member and the rear wall of said casing structure in encircling relation to that portion of said tubular valve casing projecting rearwardly from the rear wall of said casing structure; and
   vent hole means for communicating the annular space between said tubular valve casing and said collapsible boot with the interior of said tubular member.

3. A vacuum-suspended type servo-motor as claimed in claim 1, in which said output member is arranged forward of said input member in axially aligned relation therewith and which further comprises reaction means including:

a reaction disk operatively connected with said output member at the rear end thereof;

a first fulcrum on the rear surface of said reaction disk;

a second annular fulcrum of an elastic material on the rear surface of said reaction disk and spaced from the common axis of said input and output members a radial distance which is larger than that of said first annular fulcrum;

a third annular fulcrum on the front surface of said movable wall member at a radial distance from the common axis of said input and output members intermediate those of said first and second annular fulcrums;

a fourth annular fulcrum on the front end face of said input member at radial distance from the axis thereof which is smaller than that of said first annular fulcrum; and a plurality of reaction levers radially arranged between said reaction disk and said movable wall member and supported on one side by said first and second annular fulcrums and on the other side by said third annular fulcrum normally in axially spaced relation to said fourth annular fulcrum, said reaction levers being rockable with elastic deformation of said elastic material into contacting engagement with said fourth annular fulcrum when the output from said output member exceeds a predetermined value.

* * * * *